R. S. OLMSTED.
SEXTANT FOR USE WITH BALLOONS.
APPLICATION FILED JULY 31, 1920.
1,425,682.
Patented Aug. 15, 1922.
4 SHEETS—SHEET 4.
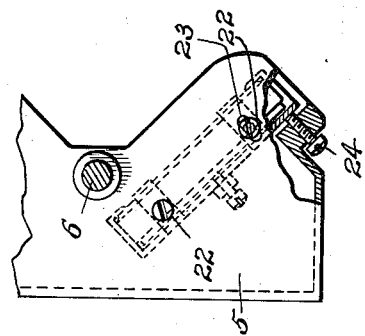
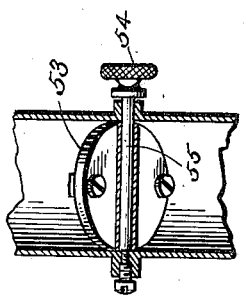
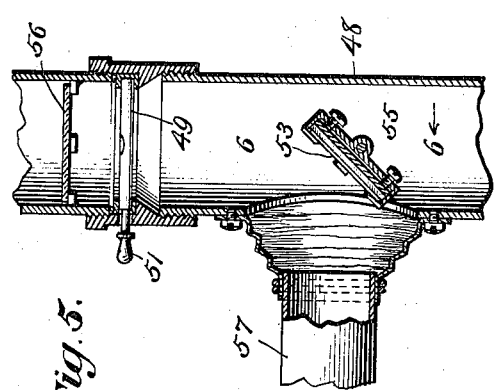
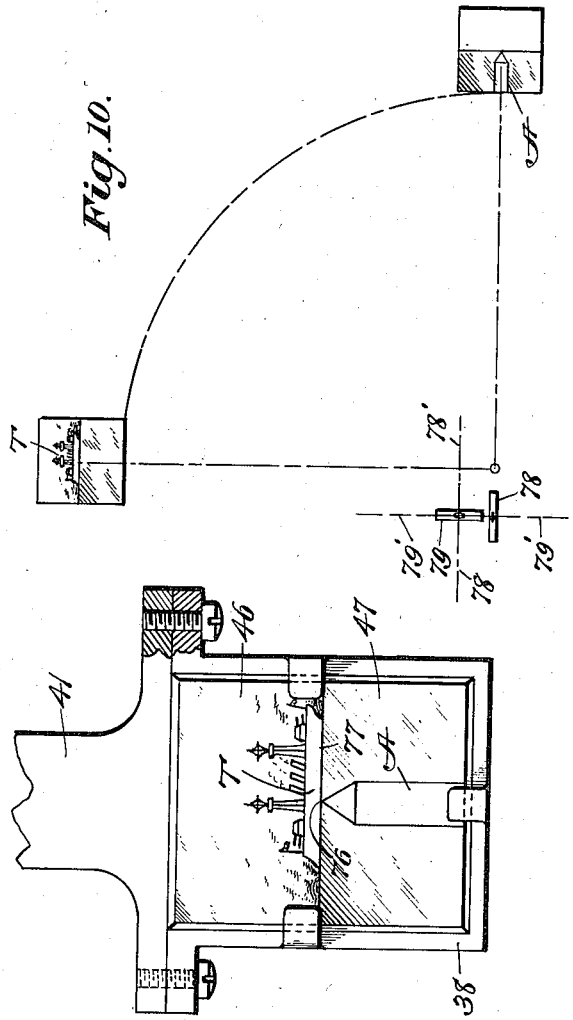
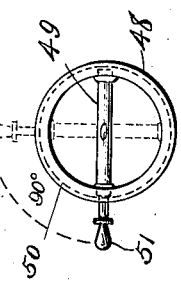
*Inventor*
Robert S. Olmsted.

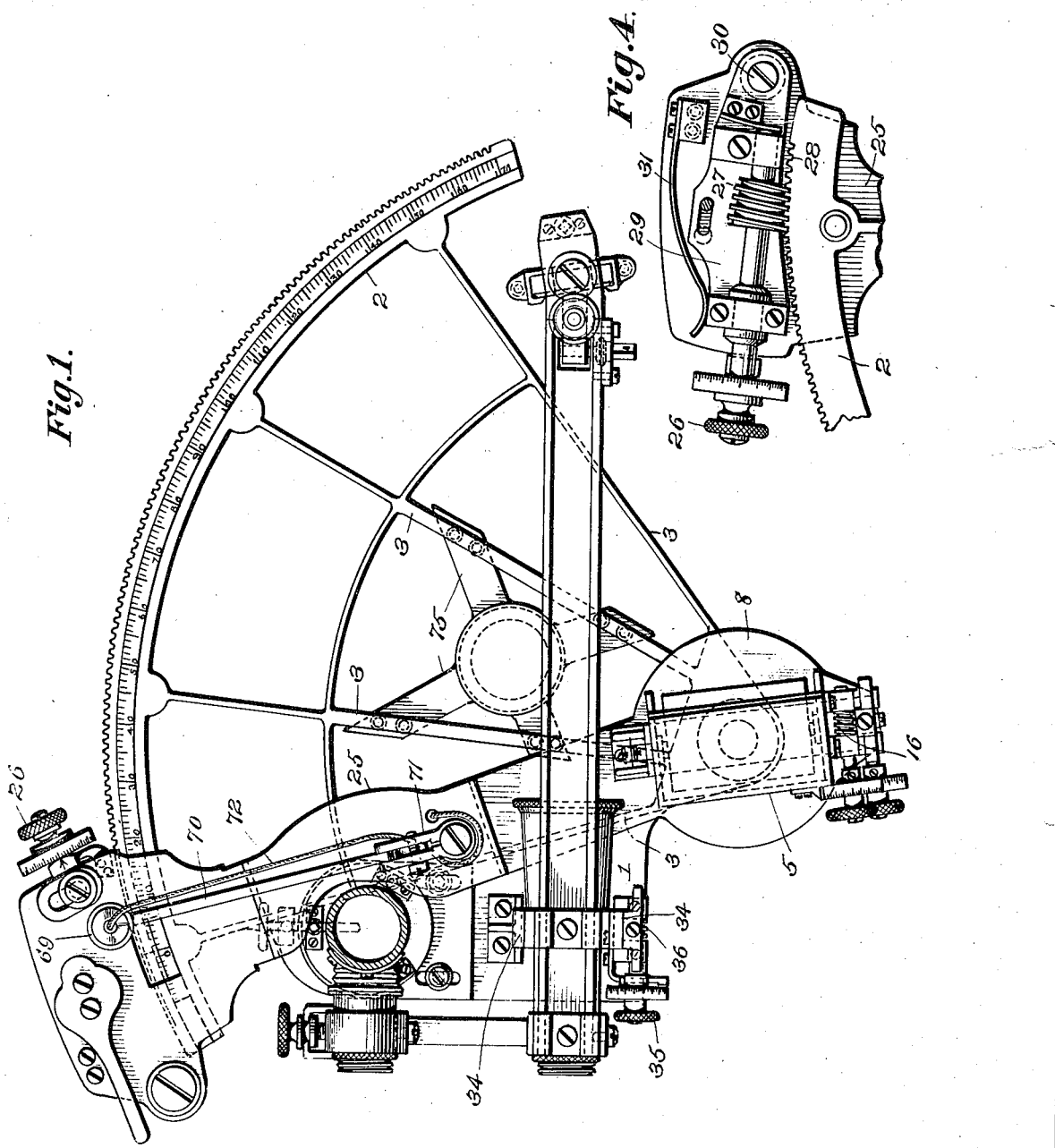

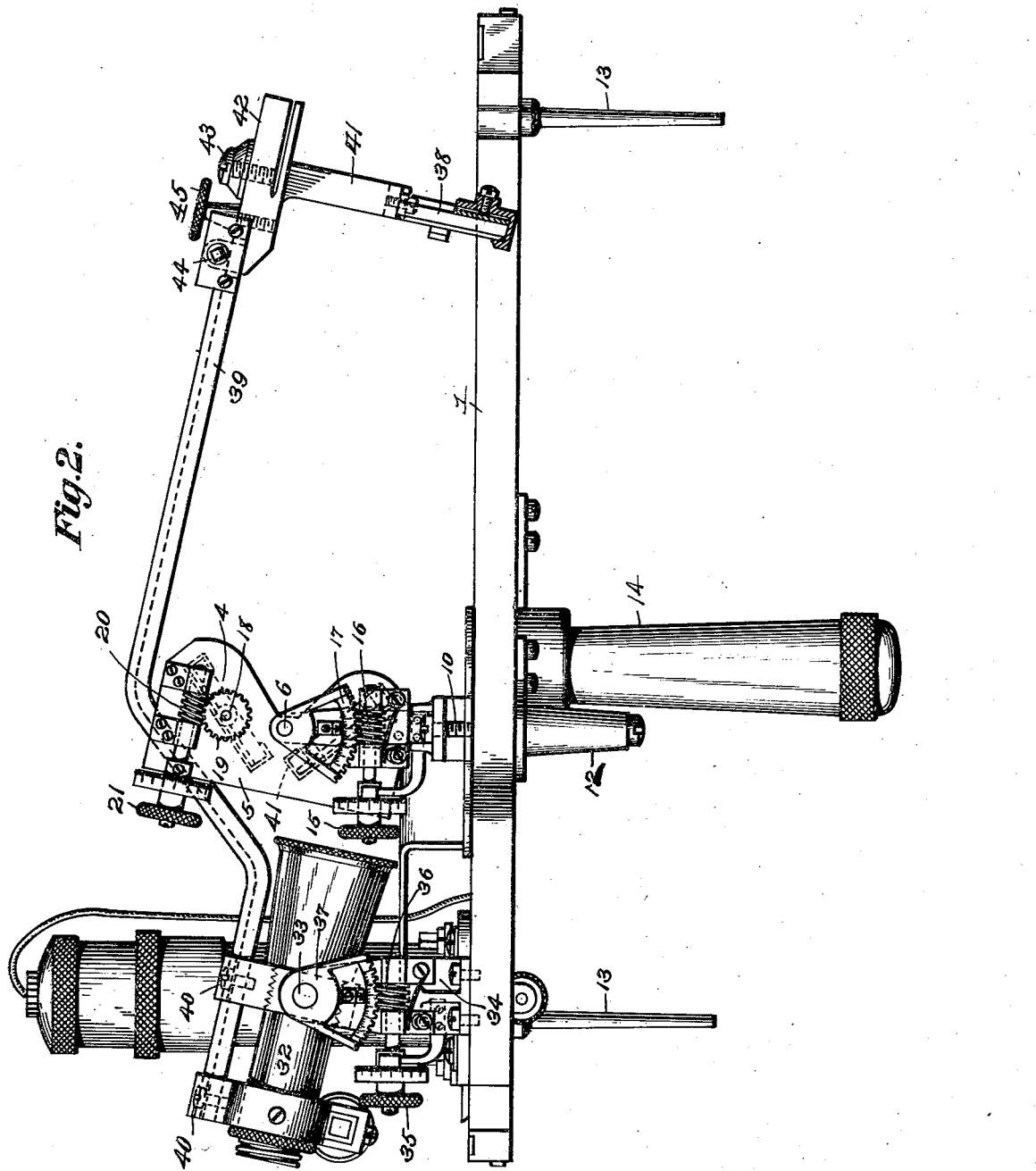

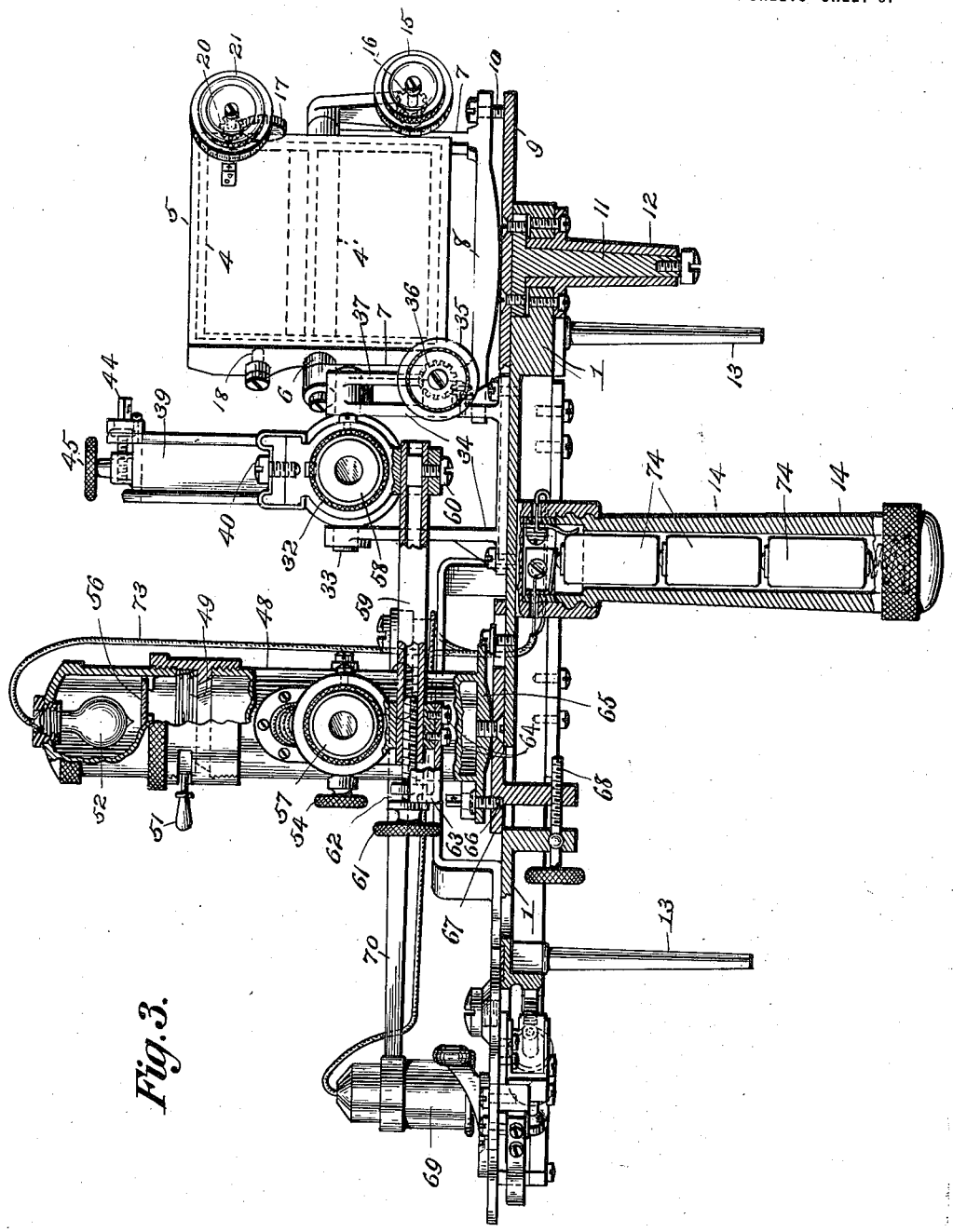

UNITED STATES PATENT OFFICE.

ROBERT S. OLMSTED, OF READING, MASSACHUSETTS.

SEXTANT FOR USE WITH BALLOONS.

1,425,682. Specification of Letters Patent. Patented Aug. 15, 1922.

Application filed July 31, 1920. Serial No. 400,535.

*To all whom it may concern:*

Be it known that I, ROBERT S. OLMSTED, citizen of the United States, residing at Reading, in the county of Middlesex and State of Massachusetts, have invented certain new and useful Improvements in Sextants for Use with Balloons, of which the following is a specification.

My invention relates to devices for accurately determining horizontal angles being especially designed for use from captive balloons for the purpose of directng artillery fire.

The device is in the form of an instrument resembling a modified sextant, the latter being used to determine vertical angles, while my instrument is utilized to determine horizontal angles. My instrument is held in a horizontal plane, and the sighting tube, index mirror and horizon glass are pivotally mounted with respect to the main body of the device so that observations may be made from the balloon on targets and aiming points which are at a level below that of the balloon.

It being essential, for accurate data that the instrument be held strictly horizontal when making observations, I have provided the same with suitable level-indicating means, to insure the proper leveling of the instrument about relatively perpendicular axes.

In the drawings illustrating one embodiment of my invention:

Fig. 1 is a plan view of my instrument;

Fig. 2 is an elevation of the same;

Fig. 3 is a view taken substantially at a right angle to Fig. 2, showing some of the parts in section;

Fig. 4 is a fragmentary bottom plan view of the tangent micrometer screw for the index arm;

Fig. 5 is a vertical section through the bubble level sight tube;

Fig. 6 is a section on the line 6—6 of Fig. 5;

Fig. 7 is a detail view of the bubble sight;

Fig. 8 is a fragmentary side elevation of the index mirror mounting;

Fig. 9 is an enlarged view of the horizon glass;

Fig. 10 is a diagram illustrating the functioning of certain parts of the instrument.

My instrument comprises a main body portion 1, and a graduated limb 2 connected thereto by spokes 3. The limb 2, like a sextant limb is graduated in degrees, (see Fig. 1).

In lieu of the usual single index mirror used in the standard sextant, I employ two mirrors 4 and 4' in superposed relation to one another. These mirrors are mounted in a frame 5 carried by a rock shaft 6 journaled in standards 7 connected at the bottom by a rocker spoke 8. The spoke 8 is adapted to be rocked or tilted on a turntable 9 by means of adjusting screws 10 which secure said parts together. In this way the index mirror frame may be accurately adjusted to properly reflect the image, target or object.

The turntable 9 may be turned on a vertical axis formed by a vertical spindle 11 preferably tapered and fitting into a corresponding taper bearing 12 on the main body 1 of the instrument. The instrument, as a whole, is shown as provided with supporting legs 13 and also a supporting handle 14 coincident with the center of gravity of the whole.

The frame 5 may be turned on the horizontal axis of the rock shaft 6 by means of a micrometer screw 15 having a worm 16 meshing with a sector 17 on said rock shaft. The upper mirror 4 is tiltable on a horizontal axis on trunnions 18 one of which carries a worm gear 19 meshing with a worm 20 on a micrometer screw 21 on the side of the frame 5. The lower mirror 4' is held in the frame 5 by screw 22 which in conjunction with seats 23 in said frame, permit the necessary angular adjustment of said lower mirror, the adjustment being fixed by means of one or more set screws 24.

By the means above described the mirrors may be adjusted on horizontal axes in the frame 5 and the latter may be tilted on the axis of shaft 6 and also turned on the vertical axis of spindle 11. The purpose of this is to properly direct or reflect upon the mirrors and to the horizon glass hereinafter referred to.

The turntable 8 has extending therefrom an index arm 25 which reaches across and beyond the limb 2, said arm having any desirable means whereby its position on said limb may be read. The arm 25 carries a tangent micrometer screw 26 having a worm 27 (see Fig. 4) meshing with a rack face 28 on the limb 2. The screw 26 is journaled in bearings on a bearing plate 29 connected by pivot 30 to the arm 25 and receiving pressure from a spring 31 which holds worm 27 in mesh with the rack face 28.

The sighting tube or telescope 32 is mounted to be turned on a horizontal axis by means of trunnions 33 journaled in standards 34 on the body 1. The adjustment of the telescope is effected by a micrometer screw 35 having bearings on one of said standards and also having a worm 36 meshing with a sector 37 on one of the trunnions 33.

The horizon glass 38 is supported on an arm 39 secured by a plurality of fasteners 40 to the telescope 32 so as to move therewith as the latter is moved. The arm 39 is bent between its ends so that the projecting end portion thereof will lie in a higher plane and support the horizon glass clear of the limb 2 and spokes 3. The glass 38 is upheld by a horizon 41 adjustably fastened to a head piece 42 by a screw 43, the head piece 42 being adjustably fastened to the arm 39 by a screw 44 and clamping or set screw 45. The horizon glass 38 may thus be adjusted in angularity to accurately reflect the image reflected by the index mirrors 4 and 4' while the target is sighted through the upper transparent portion 46 of the horizon glass, the lower portion 47 of said glass being silvered and forming a reflecting mirror or surface.

The accurate leveling of the instrument is of prime importance. This may be effected in several ways. The leveling means here shown embodies a cylinder 48 containing a spirit or bubble tube 49, the cylinder having a slot or guideway 50 to permit the bubble tube to be turned through an arc of 90° by means of a handle 51. Over the bubble tube 49 I arrange an electric lamp 52 and below said tube I place a reflector or mirror 53 the angle of which may be adjusted by the milled head 54 of a shaft 55 to which said mirror is attached. A ground glass 56 may be placed between the lamp 52 and the bubble tube 49. The mirror 53 reflects the bubble through an eye piece 57 to which one eye of the operator is placed, the other eye being placed to the eye piece 58 of the telescope 37.

To regulate the interpupillary distance between the eye pieces 57 and 58 I employ an adjusting means consisting of a bar 59 secured fixedly to the telescope 37 by fastening means 60. An adjusting screw 61 is threaded into the other end of the bar 59 and has an annular groove 62 which receives the tip of a finger 63 secured by fastening means 64 to the bottom of the eye piece 57, as shown in Fig. 3. Thus the distance between the eye pieces may be adjusted to suit different operators. The vertical attitude of the bubble sight cylinder is effected by use of a rocker base 65 on the bottom of said cylinder secured by an adjusting screw 66 to the horizontal slide or support 67 operable by an adjusting screw 68, and resting upon the main body 1 of the instrument.

An electric lamp 69 is placed over the limb 2 and index arm 25 and supported and rendered adjustable by a pivoted arm 70 extending from a bracket 71 on the arm 25. Conductors 72 from the lamp 69 and other conductors 73 from the lamp 52 extend to a battery 74 in the handle 14 which is of insulating or non-conducting material. The lamp 69 is used to facilitate reading the graduations on the limb 2. The handle may be secured to the body 1 in any desired way as by means of a spider 75 having legs fastened to the spokes 13.

The operation of the instrument will now be described. The light rays from the aiming point A are reflected downwardly by the mirror 4 upon the mirror 4' which in turn reflects the image of the aiming point upon the silvered portion 47 of the horizon glass 38 where it is visible through the telescope 37. The target is visible in the usual way through the upper transparent portion 46 of the horizon glass. The purpose of having the mirror 4 vertically above the mirror 4' is to get a proper image at the aiming point when the parts are tilted as shown in Fig. 2. The index mirror system is turned about its vertical axis by moving the arm 25 to bring the aiming point into the horizon glass. The index mirror system is also turned about the horizontal axis of the rock shaft 6 to bring the aiming point into the horizon glass. Keeping in mind that the aiming point A is on a lower level than that of the balloon in which the instrument is being used, the aiming point is brought into the silvered portion of the horizon glass so that some given point such as 76 of the aiming point A touches the line 77 that marks the dividing line of the two portions 46 and 47 of the horizon glass. While this adjustment of the point 76 is being made, care should be taken that the bubble tube 49 when in the position indicated at 78 (Fig. 10) indicates that the limb 2 is level with respect to the axis 78'—78'.

After making the above adjustment, the bubble tube 49 is turned an arc of 90° to the position 79 (Fig. 10) and the graduated limb 2 leveled with respect to the axis 79'—79' which is perpendicular to the axis 78'—78'. Keeping the limb 2 level, the target T is brought into substantially the position indicated in Fig. 9 where some definite part of the target, such as the water line of a ship, substantially coincides with the line 77. When the above adjustments have been made, further leveling of the instrument may be dispensed with. All that is necessary in subsequent observations is to bring the point 76 onto the line 77 and also bring the water line of the ship onto said line 77, positions which prove that the instrument is properly leveled. Of course, as the target moves, adjustments must be made either by manipulation of the micrometer screw 35 or by adjustment of the angle of the mirror 4 through screw 21. The point to be emphasized, however, is that the proper positioning of the aiming point and the target respectively on the horizon glass indicates the proper leveling of the instrument and dispenses with the necessity of leveling up the instrument for each observation, a feature obviously advantageous in military operations where rapidity of observations is of vital importance.

While I have illustrated an embodiment of my invention, it is to be understood that other ways and means of carrying out the same principles may be practiced, the present showing being merely illustrative.

What I claim is:

1. In an instrument for determining horizontal angles, a normally horizontal graduated limb, a sighting tube pivoted to move in a plane substantially perpendicular to the plane of said limb, a horizon glass movable with and having a normally fixed relation to the said sighting tube, means for adjusting the angle of said horizon glass in relation to the sighting tube, and an index arm movable over said graduated limb and carrying an index mirror.

2. In an instrument for determining horizontal angles, a normally horizontal graduated limb, a sighting tube pivoted to move in a plane substantially perpendicular to the plane of said limb, a horizon glass movable with and having a normally fixed relation to said sighting tube, an index arm movable over said graduated limb, an index mirror having a normally fixed relation to said arm, and means for adjusting the angularity of said index mirror in relation to said arm and the horizon glass.

3. In an instrument for determining horizontal angles, a normally horizontal graduated limb, a sighting tube pivoted to move in a plane substantially perpendicular to the plane of said limb, a horizon glass movable with said sighting tube, an index arm movable over said graduated limb and carrying an index mirror, means for adjusting the angle of said horizon glass in relation to the sighting tube and means to indicate the leveling of said graduated limb.

4. In an instrument for determining horizontal angles, a normally horizontal graduated limb, a sighting tube pivoted to move in a plane substantially perpendicular to the plane of said limb, a horizon glass movable with said sighting tube, an index arm movable over said graduated limb and carrying an index mirror, means to indicate the leveling of said graduated limb, and sighting means for said level indicating means.

5. In an instrument for determining horizontal angles, a normally horizontal graduated limb, a sighting tube pivoted to move in a plane substantially perpendicular to the plane of said limb, a horizon glass movable with said sighting tube, an index arm movable over said graduated limb and carrying an index mirror, sighting means to indicate the leveling of said graduated limb, and means for regulating the interpupillary distance between said sighting tube and sighting means.

6. In an instrment for determining horizontal angles, a normally horizontal graduated limb, a sighting tube pivoted to move in a plane substantially perpendicular to the plane of said limb, a horizon glass movable with said sighting tube, an index arm movable over said graduated limb and carrying an index mirror, means to indicate the leveling of said graduated limb, and sighting means for said level indicating means, said level indicating means serving to indicate the leveling of the graduate limb about relatively perpendicular axes both in a common horizontal plane.

7. In an instrument for determining horizontal angles, a normally horizontal graduated limb, an index arm pivotally mounted on a normally vertical axis to move over said graduated limb, a micrometer screw adjustment between said index arm and limb, an index mirror system mounted upon and carried by said arm, a sighting tube movable perpendicular to the plane of said limb, an arm extending from and fixedly attached to said sighting tube and a horizon glass carried by said arm.

8. In an instrument for determining horizontal angles, a normally horizontal graduated limb, a sighting tube pivoted to move in a plane substantially perpendicular to the plane of said limb, a horizon glass movable with and having a normally fixed relation to said sighting tube, an index arm movable over said graduated limb, and an index mirror system carried by said index arm and embodying upper and lower relatively superposed mirrors, one of which is adjustable about a normally horizontal axis in relation to the other mirror.

9. In an instrument for determining horizontal angles, a normally horizontal graduated limb, a sighting tube pivoted to move in a plane substantially perpendicular to the plane of said limb, a horizon glass movable with and having a normally fixed relation to said sighting tube, an index arm movable over said graduated limb, and an index mirror system carried by said index arm and embodying upper and lower relatively superposed mirrors, one of which is adjustable about a normally horizontal axis in relation to the other mirror, a frame in which said mirrors are mounted, and means for turning said frame about a normally horizontal axis.

10. In an instrument for determining horizontal angles, a normally horizontal graduated limb, a sighting tube pivoted to move in a plane substantially perpendicular to the plane of said limb, a horizon glass movable with and having a normally fixed relation to said sighting tube, an index arm movable over said graduated limb, and an index mirror system carried by said index arm and embodying upper and lower relatively superposed mirrors, one of which is adjustable about a normally horizontal axis in relation to the other mirror, and means for turning said index mirror system about a normally vertical axis.

11. In an instrument for determining horizontal angles, a normally horizontal graduated limb, a sighting tube pivoted to move in a plane substantially perpendicular to the plane of said limb, a horizon glass movable with and having a normally fixed relation to said sighting tube, an index arm movable over said graduated limb, and an index mirror system mounted upon and carried by said index arm and embodying a reflecting surface adjustable about vertical and horizontal axes.

In testimony whereof I have affixed my signature.

ROBERT S. OLMSTED.